Aug. 11, 1970    M. W. GITTINS ET AL    3,523,705

GATE LATCH

Filed Oct. 11, 1967    3 Sheets-Sheet 2

INVENTORS
MARVIN W. GITTINS
VERN L. GITTINS

BY

United States Patent Office 3,523,705
Patented Aug. 11, 1970

3,523,705
GATE LATCH
Marvin W. Gittins, Crescent, Iowa 51526, and Vern L.
Gittins, Rte. 1, Council Bluffs, Iowa 51501
Filed Oct. 11, 1967, Ser. No. 678,771
Int. Cl. E05c 5/00
U.S. Cl. 292—299        6 Claims

ABSTRACT OF THE DISCLOSURE

A deflecting ring-type gate latch having a ring-holding locking pin which is removable for the rapid unlocking of the latch.

---

A deflecting ring-type gate latch having a tongue provided with a retainer for resisting bowing of the gate and having tongue support means for resisting sagging of the gate.

A deflecting ring gate latch having a quick release feature in which a ring-retaining pin can be removed from retaining position and with means for making possible removal of the retaining pin by an operator disposed remotely from the latch.

In the prior art, ring-type gate latches have not heretofore had means for resisting bowing of the gate nor for the resisting of sagging of the gate nor for the removal of means holding a ring in a gate latching position.

On cattle trucks accidents resulting in broken bones and even death have occurred when an operator climbs into the cattle truck to manipulate the gate latch of a prior art type. The pressure of the cattle against the other side of the gate is often such as to sweep the gate open pinning the operator behind the gate with force or knocking the operator down to be trampled on.

It is, therefore, an object of this invention to provide a gate latch which can be released by an operator disposed outside of the truck sidewalls where he is safe from the rush of cattle.

Figure 1:
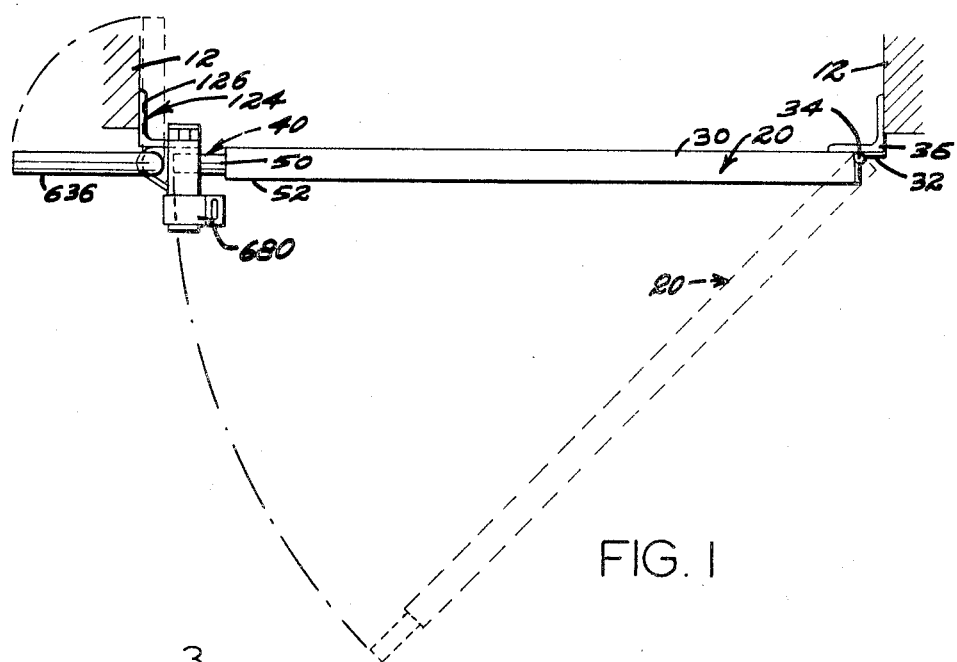
FIG. 1 is a top plan view of a gate shown as attached to portions of the sidewalls of a cattle truck, dotted lines showing an open position of the gate, other dotted lines showing the latch releasing position of a latch opening handle.
Figure 2:
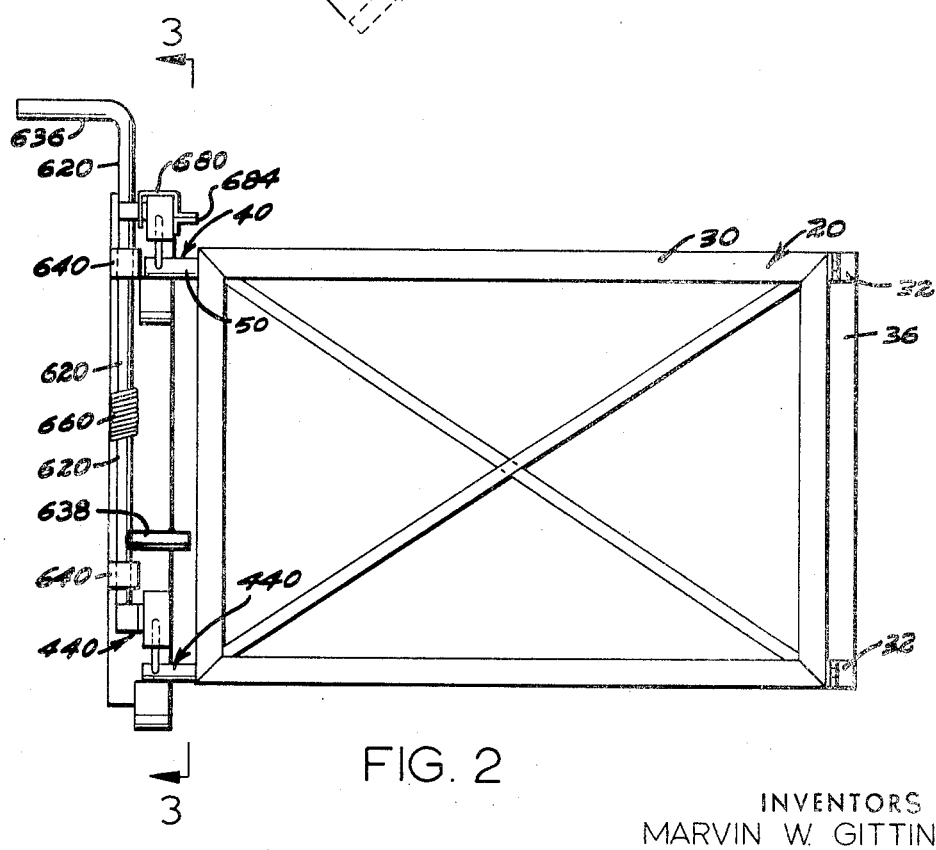
FIG. 2 is a frontal elevation of the gate and of the gate latch assembly of FIG. 1.

A cattle truck and gate assembly of this invention is generally indicated at 10 in FIG. 1, cattle truck sidewalls being shown at 12 in section and a gate latch assembly generally indicated at 20 has a gate 30 mounted on hinge means 32 for rotation about a vertical axis 34 on hinge support 36 attached to one of the sidewalls 12.

The gate 30 has a gate latch assembly 40 attached to its other end, the gate latch assembly 40 comprising a gate tongue 50 adapted to be attached to the free end 52 of the horizontally swinging gate 30.

Figure 4:
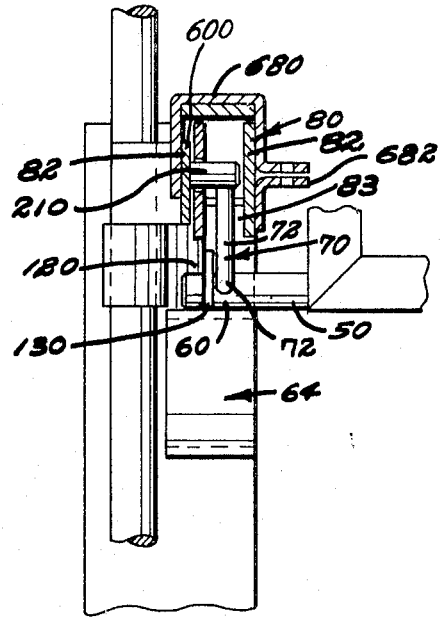
FIG. 4 is a sectional view taken along the line 4—4 of FIG. 3.
Figure 6:
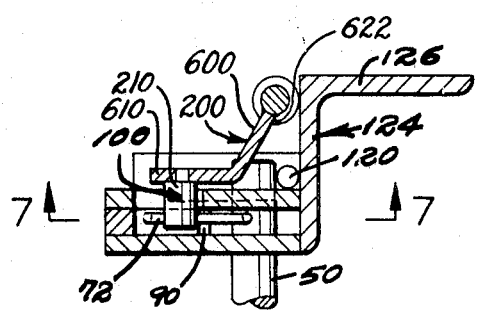
FIG. 6 is a sectional view taken along the line 6—6 of FIG. 3.
Figure 6:
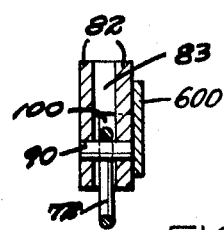

The gate tongue 50 has a latching portion best seen in FIG. 4 at 60.

The gate latch assembly 40 further has a gate tongue securing assembly 70 comprising a ring 72, the ring 72 lying in a substantially vertical plane transverse to the elongation of the tongue 50.

A ring receiving frame 80 is provided having vertical plates or side portions 82 disposed on each side of the ring 72 for maintaining the ring in a position transverse to the tongue.

The ring receiving frame 80 has a ring receiving recess 83 therein, as best seen in FIG. 4, of the size for receiving the ring at times when the ring is caused to move upwardly by the passing of the tongue 50 under the center of the ring.

Figure 7:
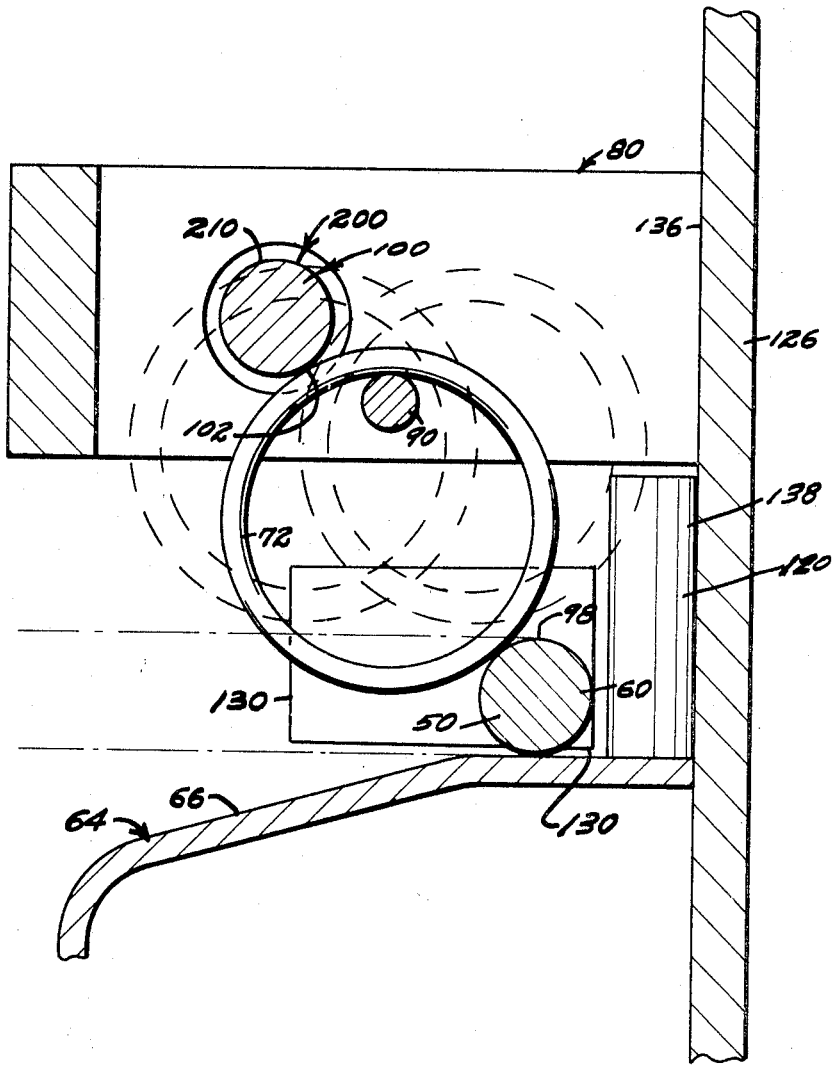
FIG. 7 is a sectional view taken along the line 7—7 of FIG. 5.

A ring retainer 90 is best seen in FIG. 7 and is attached to the ring receiving frame 80 and extends approximately horizontally through the center opening of the ring in a position such that when the upper side of the ring engages the retainer 90, the lower side of the ring will be disposed below the upper surface 98 of the latching portion 60 of the tongue.

A ring holding means generally indicated at 100 is further provided having a lower surface 102 disposed in a position for engaging the upper side of the ring at a time when the retainer 90 is engaging the ring and when the ring has its lower side disposed beneath the upper side of the tongue and with the tongue on a certain side of the ring in a gate-closed position, as seen in FIG. 7.

As best seen in FIG. 4, the tongue 50 has a longitudinal movement retainer 130 extending transversely of it and protruding beyond the tongue 50 in a position for engaging the ring 72 at times when the tongue is moved horizontally toward the middle of the gate so as to prevent movement of the longitudinal movement retainer 130 and of the tongue 50 in a direction toward the middle of the gate so that cattle striking the center of the gate will not cause the gate to bow to such an extent as to pull the tongue 50 out of latching position.

The latch assembly further has tongue movement limiting means 120, best seen in FIG. 7, for preventing the tongue 50 from moving in a horizontal direction away from the rings so as to prevent the gate from opening in a direction away from the ring, the tongue movement limiting means 120 being suitably attached to gate post, means 124 which can be an angle iron 126 shown in FIG. 1 and which is attached to the adjacent sidewall 12 of the cattle truck.

In a sense, the angle irons 126 and 36 can be called gate posts 126 and 36.

Mounting means in the form of welding 136 and 138 is provided for mounting the ring receiving frame 80 and the tongue movement limiting means 120 respectively on the gate post 126, as best seen in FIG. 7.

The gate latch assembly further has a ring locking assembly 200 of which the locking pin 210 forms a part, the locking pin 210 serving as the ring holding means 100 and disposed at times in a locking position above the ring and on the opposite side of the ring from the latching portion 60.

The ring locking assembly 200 further comprises a substantially horizontal swinging lever 600 having a freely swinging end 610 attached to the locking pin 210. A vertical control shaft 620 having a handle portion 636 is provided and the other end 622 of the lever 600 is attached to the control shaft 620. Means are provided on the control shaft 620 for facilitating the movement of the shaft 620 about a vertical axis for causing the locking pin 210 to move out of locking position. A means 640 is provided for rotatably mounting the vertical shaft 620 for rotation about a vertical axis.

Figure 3:
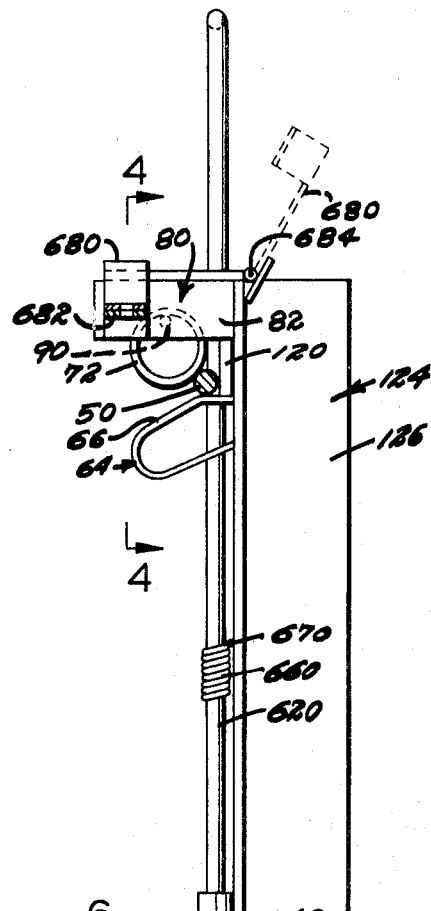
FIG. 3 is a sectional view taken along the line 3—3 of FIG. 2, an open position of a locking pin securing assembly being shown in dotted lines.
Figure 5:
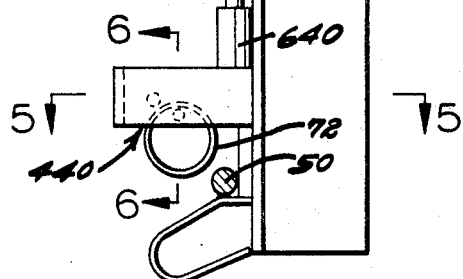
FIG. 5 is a sectional view taken along the line 5—5 of FIG. 3.

Overcomeable spring means 660 is attached to the shaft 620 and urges shaft 620 into a position for maintaining the locking pin 210 in locking position. In FIG. 3, a locking assembly 684 is shown having a lower member 682 and an upper member 680. The members 680 and 682 being adapted to receive a padlock not shown therethrough.

What is claimed is:

1. A gate latch assembly (40) comprising a gate tongue (50) adapted to be attached to the free end (52) of a horizontally swinging gate (30), said gate tongue (50) having a latching portion (60), a gate tongue securing assembly (70) comprising a ring (72), said ring (72) lying in a substantially vertical plane transverse to the elongation of said tongue (50), a ring receiving frame (80) having portions (82) disposed on each side of said ring for maintaining said ring in said position transverse to said tongue (50), said ring receiving frame (80) having a ring-receiving recess (82) therein of a size for receiving said ring at times when said ring is caused to move upwardly by the passing of said tongue (50) under the center of the ring, a ring retainer (90) attached to said ring-receiving frame (80) and extending approximately horizontally through the center opening of said ring in a position such that when an upper side of said ring engages said retainer (90) the lower side of said ring will be disposed below the upper surface (98) of said latching portion (60) of said tongue, a ring holding lock-pin (210) having a lower surface (102) disposed in a position for engaging the upper side of said ring at a time when said retainer (90) is engaging said ring and when said ring has its lower side beneath the upper side of said tongue and with said tongue on a different side of said ring from said locking pin 210 and in a gate-closed position, said locking pin (210) being adapted to engage an adjacent portion of the adjacent upper outer surface of said ring at a time when the upper inner surface of said ring engages said retainer (90), said locking pin (210) preventing the lower side of said ring from moving in a direction toward the locking pin (210) side of said ring under pressure from said tongue as prevents said gate from opening in a direction toward said locking pin (210) side of said ring, said ring receiving frame having opening means through one side thereof removably receiving said locking pin and permitting said locking pin to be removed through said opening means so as to retreat to an unlocking position out of possible engagement with said ring, means attached to said locking pin for removably maintaining said locking pin in said locking position with respect to said ring frame at desired times.

2. The combination of claim 1 in further combination with a tongue movement limiting means (120) for preventing said tongue from moving in a horizontal direction away from said ring so as to prevent a gate from opening in a direction away from said ring, and mounting means (136, 138) for mounting said ring receiving frame (80) and the ring-holding means (120) respectively.

3. The combination of claim 1 in which said tongue (50) has a longitudinal movement retainer (130) attached thereto and extending transversely thereof in a position for engaging said ring at times when said tongue is moved horizontally toward the middle of said gate so as to prevent movement of said longitudinal movement retainer and of said tongue in a direction toward said gate so that cattle striking the center of said gate cannot cause it to bow to an extent to pull said tongue out of latching position.

4. The combination of claim 1 in which said means attached to said locking pin (210) comprises a substantially horizontal swinging lever (600) having a freely swinging end (610) attached to said locking pin (210), a vertical control shaft (620), the other end (622) of said lever (600) being attached to said control shaft (620), means on said control shaft for facilitating the movement of said shaft about a vertical axis for causing said locking pin to move out of locking position, means (640) for rotatably mounting said vertical shaft (620) on said assembly for rotation about a vertical axis.

5. The combination of claim 4 in further combination with overcomeable spring means (660) attached to said shaft (620) and urging said shaft (620) into a position for maintaining said locking pin (210) in locking position.

6. A gate latch assembly (40) comprising a gate tongue (50) adapted to be attached to the free end (52) of a horizontally swinging gate (30), said gate tongue (50) having a latching portion (60), a gate tongue securing assembly (70) comprising a ring (72), said ring (72) lying in a substantially vertical plane transverse to the elongation of said tongue (50), a ring receiving frame (80) having portions (82) disposed on each side of said ring for maintaining said ring in said position transverse to said tongue (50), said ring receiving frame (80) having a ring-receiving recess (82) therein of a size for receiving said ring at times when said ring is caused to move upwardly by the passing of said tongue (50) under the center of the ring, a ring retainer (90) attached to said ring receiving frame (80) and extending approximately horizontally through the center opening of said ring in a position such that when an upper side of said ring engages said retainer (90) the lower side of said ring will be disposed below the upper surface (98) of said latching portion (60) of said tongue, a ring-holding means having a lower surface disposed in a position for engaging the upper side of said ring at a time when said retainer (90) is engaging said ring and when said ring has its lower side beneath the upper side of said tongue with said tongue on a different side of said ring from the ring-holding means so as to be in a gate-closed position for preventing said tongue from moving horizontally in a direction generally toward said ring-holding means to prevent said gate from opening accidentally, and mounting means attached to said ring-receiving frame and to said ring-holding means, said tongue (50) having a longitudinal movement retainer (130) attached thereto and extending transversely thereof in a position for engaging said ring at times when said tongue is moved horizontally toward the middle of said gate so as to prevent movement of said longitudinal movement retainer and of said tongue in a direction toward said gate so that cattle striking the center of said gate cannot cause it to bow to an extent to pull said tongue out of latching position.

References Cited

UNITED STATES PATENTS

| 970,345 | 9/1910 | Munsinger | 292—299 |
|---|---|---|---|
| 1,038,954 | 9/1912 | Pochyla | 292—299 |
| 1,255,545 | 2/1918 | Martz | 292—299 |
| 2,838,334 | 6/1958 | Cornwell | 292—299 |

FOREIGN PATENTS

| 588,042 | 5/1947 | Great Britain. |
|---|---|---|

RICHARD E. MOORE, Primary Examiner

E. J. McCARTHY, Assistant Examiner